L. B. CRAIG.
CLAMP.
APPLICATION FILED NOV. 3, 1920.
1,408,933.
Patented Mar. 7, 1922.
2 SHEETS—SHEET 1.
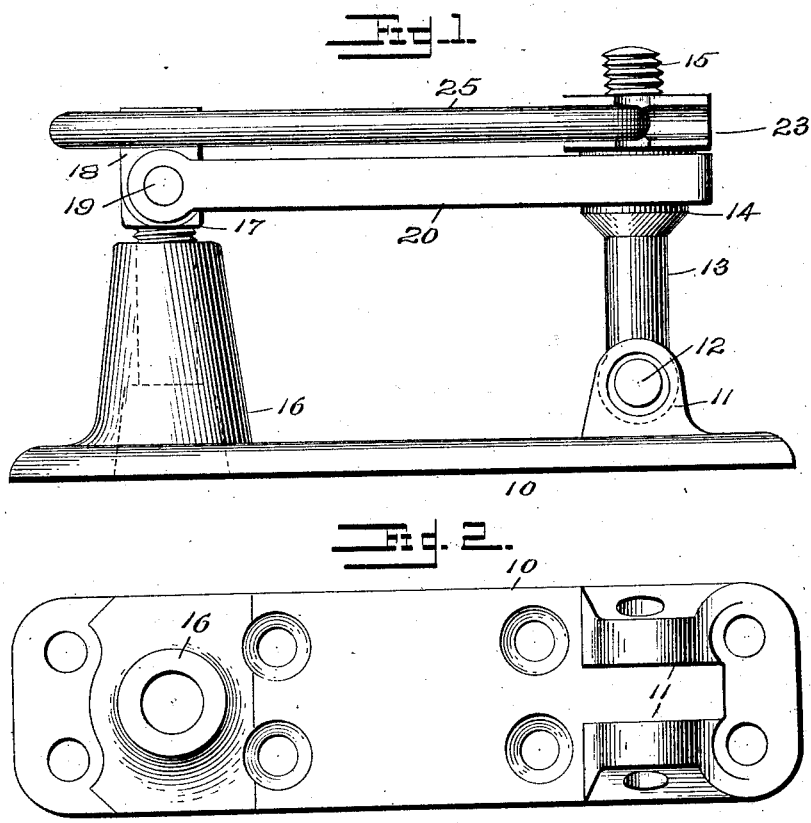
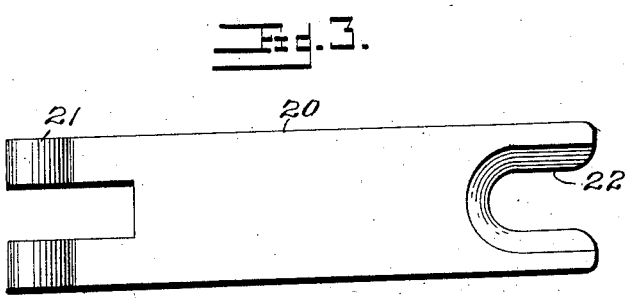
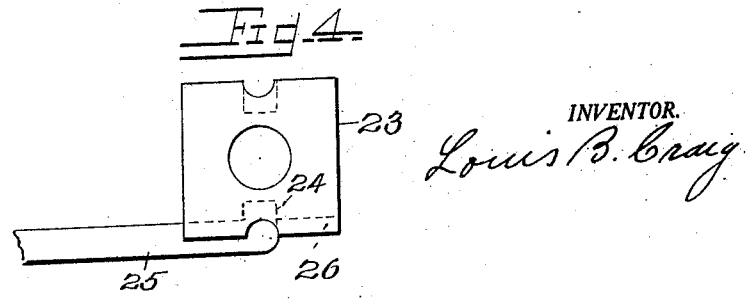
INVENTOR.
Louis B. Craig

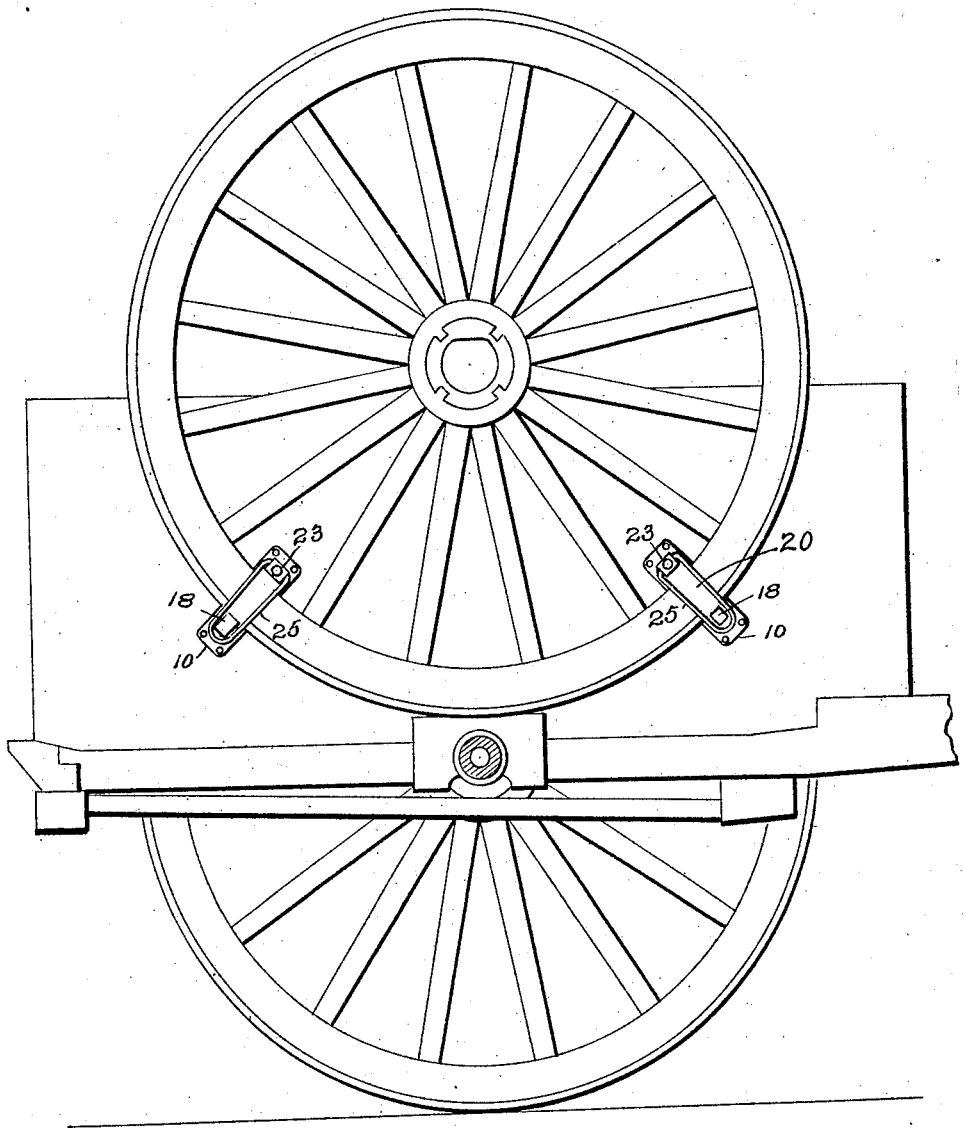

UNITED STATES PATENT OFFICE.

LOUIS B. CRAIG, OF DAVENPORT, IOWA.

CLAMP.

1,408,933.

Specification of Letters Patent.   Patented Mar. 7, 1922.

Application filed November 3, 1920.   Serial No. 421,610.

(FILED UNDER THE ACT OF MARCH 3, 1883, 22 STAT. L., 625.)

*To all whom it may concern:*

Be it known that I, LOUIS B. CRAIG, a citizen of the United States, and a resident of Davenport, county of Scott, State of Iowa, have invented an Improvement in Clamps, of which the following is a specification.

The invention described herein may be used by the Government, or any of its officers or employees in prosecution of work for the Government, or by any other person in the United States, without payment to me of any royalty thereon.

The subject of this invention is a clamp designed especially for securing a spare wheel in place on a vehicle.

The main objects of the present invention are the provision of a clamp which may be readily opened to receive a wheel and which may be quickly and effectively closed and held in closed position to retain the wheel.

To accomplish these objects, I provide a stationary stud, a swinging bolt, a pivoted retaining or clamp plate, means for holding the clamp in place, and means for operating the holding means and locking it in plate holding position.

With these and other objects in view, the invention consists in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings wherein:—

Figure 1 is a side elevation of the clamp;

Fig. 2 is a plan view of the clamp base plate;

Figure 3 is a similar view of the clamping plate;

Figure 4 is a plan view of the locking nut and lever; and

Figure 5 is a view in side elevation of a vehicle equipped with the clamps, the near wheel removed and the axle shown in section.

Referring to the drawings by numerals of reference, a base plate 10 is provided which is apertured to receive screws or bolts by means of which it may be fastened to a suitable portion of the vehicle. Spaced apart ears 11 are formed on and rise from the plate adjacent one end thereof and these ears are apertured to receive a pin 12 by means of which an eye-bolt 13 is mounted for swinging movement between the ears. A collar 14 encircles a median portion of the bolt to form a rest and the free end of the bolt above the collar is threaded as at 15.

Adjacent the other end of the plate, a pillar 16 is formed which is cored and tapped to receive a threaded post 17 formed with a head 18 preferably of rectangular cross section.

The head 18 is apertured to receive a pin 19 which pivotally connects a clamping plate 20 to the head passing through eyes formed in the prongs 21 of the bifurcated end of the plate.

The opposite end of the clamping plate is formed with a recess 22 to permit such end to straddle the bolt 13 and rest or seat upon the collar 14.

A nut 23 is adapted for threaded engagement with the threaded end 15 of the bolt 13 and is provided with recesses or sockets for the reception of angularly disposed ends 24 of a resilient loop lever 25 by means of which the nut may be threaded on or off and the loop end of which is adapted to engage over the head 18 when the nut is screwed home to hold the nut against accidental displacement.

For the purpose of releasably retaining the lever 25 in its position, looped over the head 18, grooves 26 are provided in those opposite faces of the nut 23 in which the sockets are formed and into these grooves the sides of the lever snap when the lever is folded down upon the head 18.

In practice, the device is operated in the following manner. The looped lever 25 is lifted from its position upon the head 18 and is then used as a lever or handle by which the nut 23 is threaded off of the bolt 13. When the nut has been threaded off to a sufficient distance, the bolt 13 may be swung on its pin 12 to disengage from the recessed end of the clamp plate 20. The plate 20 may then be swung on the pivot pin 19 to give a clear space between the pillar 16 and ears 11 for the reception of a rim and tire of a spare wheel. The wheel having been placed in position, the clamping plate is swung down upon its rim, the swinging bolt swung up to enter the recess 22, the nut threaded on to clamp the parts in place and the lever 25 brought down into position upon the head 18.

Having described my invention, what I claim as new and desire to secure by Letters Patent is:—

1. A clamp including a base plate, spaced apart ears rising from the base plate adjacent one end thereof, a pillar rising from the base plate adjacent its other end, a bolt mounted for swinging movement between the ears, a collar formed on the bolt, a post mounted in the pillar, a clamp plate pivotally secured to the post and having a recessed end to straddle the bolt and seat upon the collar, a nut adapted for threaded engagement with the bolt and having sockets and grooves communicating with said sockets formed in opposite faces thereof, and a loop lever formed with angularly disposed ends adapted to enter the sockets to pivotally connect the lever to the nut, the sides of the lever adapted to snap into the groove when the lever is in closed position, and the loop of the lever adapted to embrace the head of the post to lock the lever and nut against movement relative to the bolt.

2. A clamp including a base plate, a bolt connected for swinging movement to the plate adjacent one end thereof, a post connected to the plate adjacent its other end, a clamping plate pivotally connected to the post and adapted to engage the bolt, a nut formed for threaded engagement with the bolt for clamping the clamping plate to the bolt and a lever for manipulating the bolt engageable with the post to hold the nut against movement relative to the bolt, the nut and lever co-operating to retain the lever in detachable engagement with the post.

3. A clamp including a base plate, a bolt connected for swinging movement to the plate adjacent one end thereof, a post connected with the plate adjacent its other end, a clamping plate connected to the post to be swung into and out of engagement with the bolt, means for securing the clamping plate to the bolt, and means, including the securing means, engageable with the post for releasably retaining the securing means in clamping position.

4. A clamp including a base plate, a bolt connected to the plate adjacent one end thereof, a post connected with the plate adjacent its other end, a clamp plate connected to the post and movable into and out of engagement with the bolt, means for securing the plate to the bolt, and means including the securing means, engageable with the post for releasably retaining the securing means in secured position.

LOUIS B. CRAIG.